United States Patent
Kawamura

(10) Patent No.: US 10,897,220 B2
(45) Date of Patent: Jan. 19, 2021

(54) MOTOR CONTROL DEVICE AND MOTOR CONTROL METHOD

(71) Applicant: NISSAN MOTOR CO., LTD., Yokohama (JP)

(72) Inventor: Hiromichi Kawamura, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 109 days.

(21) Appl. No.: 15/575,463

(22) PCT Filed: May 21, 2015

(86) PCT No.: PCT/JP2015/064599
§ 371 (c)(1),
(2) Date: Nov. 20, 2017

(87) PCT Pub. No.: WO2016/185601
PCT Pub. Date: Nov. 24, 2016

(65) Prior Publication Data
US 2018/0167014 A1     Jun. 14, 2018

(51) Int. Cl.
*H02P 27/08* (2006.01)
*H02P 29/024* (2016.01)
(Continued)

(52) U.S. Cl.
CPC .............. *H02P 27/08* (2013.01); *H02P 27/02* (2013.01); *H02P 29/027* (2013.01); *H02P 29/40* (2016.02)

(58) Field of Classification Search
CPC ........... H02P 27/08; H02P 29/40; H02P 27/02
(Continued)

(56) References Cited

U.S. PATENT DOCUMENTS

| 6,177,774 B1* | 1/2001 | Iwashita ............... H02H 7/0838 318/434 |
| 2004/0214689 A1* | 10/2004 | Kaneko ............... F02N 11/0844 477/203 |

(Continued)

FOREIGN PATENT DOCUMENTS

| CN | 103312262 A | 9/2013 |
| CN | 103956944 A | 7/2014 |

(Continued)

OTHER PUBLICATIONS

Geng Da-Yong et al., Simulation of Soft Starting Control System for Asynchronous Motor Based on SIMULINK, Journal of Liaoning Institute of Technology, vol. 26, No. 3, Jun. 30, 2006, pp. 141-144.

*Primary Examiner* — Eduardo Colon Santana
*Assistant Examiner* — Devon A Joseph
(74) *Attorney, Agent, or Firm* — Foley & Lardner LLP

(57) ABSTRACT

The present invention includes: a control initiation-stop determiner which receives an initiation-stop request signal for controlling initiation and stop of a motor and information on the number of revolutions of the motor and which outputs a state signal for switching a state of a drive voltage among three states of control stop, control initiation, and control start; and a drive voltage controller which gradually increases a phase current supplied to the motor by using a PWM signal while the state signal causes the state of the drive voltage to transition from control stop to the control initiation and then to the control start.

12 Claims, 15 Drawing Sheets

(51) Int. Cl.
*H02P 29/40* (2016.01)
*H02P 27/02* (2016.01)

(58) Field of Classification Search
USPC .......................................................... 318/812
See application file for complete search history.

(56) References Cited

U.S. PATENT DOCUMENTS

| | | |
|---|---|---|
| 2007/0075674 A1 | 4/2007 | Tsubota |
| 2008/0272724 A1 | 11/2008 | Hayashi |
| 2009/0322264 A1* | 12/2009 | Imura .................. H02P 21/0089 |
| | | 318/400.09 |
| 2011/0080125 A1* | 4/2011 | Shimada .................... H02P 5/74 |
| | | 318/400.09 |
| 2011/0180339 A1* | 7/2011 | Kawamura .............. B60K 6/52 |
| | | 180/65.245 |
| 2011/0241578 A1* | 10/2011 | Kim ........................ B60L 50/13 |
| | | 318/400.02 |
| 2013/0127383 A1* | 5/2013 | Kawamura ............... H02P 3/22 |
| | | 318/400.09 |
| 2013/0141953 A1* | 6/2013 | Nakamura .............. H02P 21/22 |
| | | 363/74 |
| 2013/0147407 A1* | 6/2013 | Kawamura .............. G01K 3/04 |
| | | 318/400.21 |
| 2017/0287434 A1* | 10/2017 | Uekuri .................... G09G 5/003 |
| 2018/0076750 A1* | 3/2018 | Yoshida .................. H02P 21/18 |

FOREIGN PATENT DOCUMENTS

| | | |
|---|---|---|
| EP | 0 837 549 A2 | 4/1998 |
| EP | 0 939 473 A2 | 9/1999 |
| JP | 11-252990 A | 9/1999 |
| JP | 2007-104768 A | 4/2007 |
| JP | 2008-271694 A | 11/2008 |

* cited by examiner

MOTOR CONTROL DEVICE AND MOTOR CONTROL METHOD

TECHNICAL FIELD

The present invention relates to a motor control device and a motor control method which control a phase current of a motor by using a drive voltage supplied to the motor.

BACKGROUND ART

Conventionally, among motor control devices which control phase currents supplied to a motor by using a PWM (Pulse Width Modulation) method (hereafter, referred to as PWM control), there is known a motor control device which determines that the motor control is unstable when a phase current flowing in at least one phase exceeds a predetermine value, and stops the PWM control (Patent Literature 1). In the method disclosed in Patent Literature 1, the PWM control is resumed when the phase current falls below the predetermined value.

CITATION LIST

Patent Literature

Patent Literature 1: Japanese Patent Application Publication No. Hei 11-252990

SUMMARY OF INVENTION

However, in Patent Literature 1, since the PWM control is resumed at the moment when the phase current falls below the predetermined value, overshoot may occur in the phase current just after the resuming and cause vibration in motor torque.

The present invention has been made in view of the problem described above and an object thereof is to provide a motor control device and a motor control method which reduce overshoot of a phase current occurring at resuming of PWM control and thereby suppress vibration occurring in motor torque.

A motor control device according to one aspect of the present invention includes a control initiation-stop determiner and a drive voltage controller. When a state of a drive voltage supplied to a motor is to be transitioned from a stop state in which control of the drive voltage is stopped to a start state in which the control is executed, the control initiation-stop determiner switches the state of the drive voltage to an initiation state during the transition from the stop state to the start state. The drive voltage controller controls the drive voltage such that the phase current increases or decreases in the initiation state as time elapses.

DESCRIPTION OF EMBODIMENTS

Figure 1:
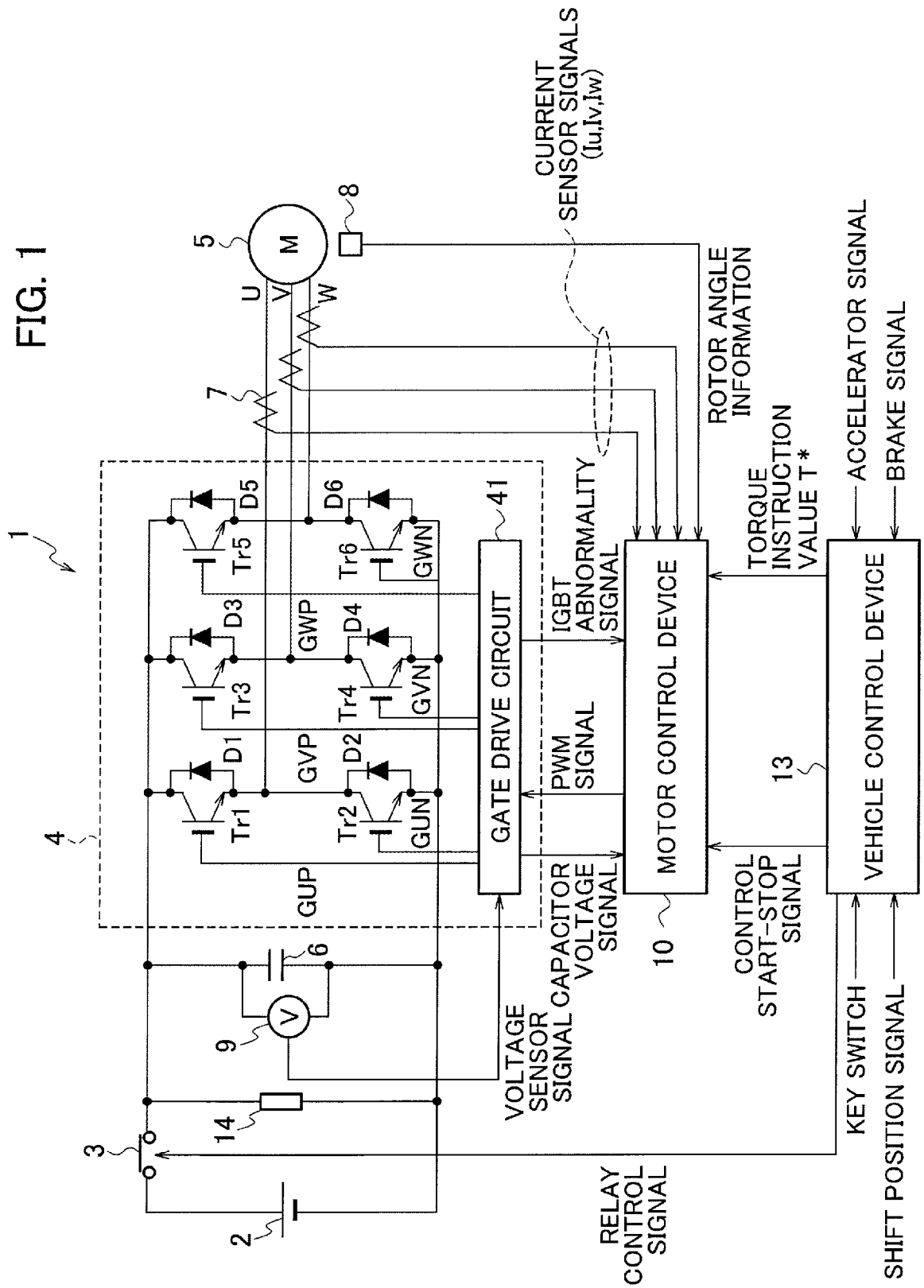
FIG. 1 is a diagram illustrating a configuration example of a drive power supply device 1 for an electric car.

Embodiments are described with reference to the drawings. In the description of the drawings, the same parts are denoted by the same reference numerals and description thereof is omitted. Before describing a motor control device 10 of a first embodiment, description is given of a drive power supply device 1 of an electric car which includes the motor control device 10 of the first embodiment.

[Drive Power Supply Device of Electric Car]

FIG. 1 illustrates a configuration example of the drive power supply device 1 of an electric car which includes the motor control device 10 of the first embodiment. The drive power supply device 1 supplies drive power supply to a three-phase permanent magnet synchronous electric motor (hereafter, referred to as motor) which drives, for example, an electric vehicle such as a hybrid car or an electric car.

The drive power supply device 1 includes a battery 2, relay units 3, 14, an inverter 4, a motor 5, a capacitor 6, current sensors 7, an angle sensor 8, a voltage sensor 9, the motor control device 10, and a vehicle control device 13.

The battery 2 is a DC power supply consisting of a secondary cell and the like. The DC voltage of the battery 2 is supplied to the inverter 4 and the capacitor 6 via the relay unit 3. When the relay unit 3 is turned on, the relay unit 14 connected in parallel to the battery 2 is opened. Turn-on of the relay units 3, 14 is controlled by an ON/OFF operation (relay control signal) of a key switch operated by a driver, via the vehicle control device 13 to be described later.

The inverter 4 performs power conversion between the battery 2 and the motor 5. The inverter 4 converts the DC power supplied from the battery 2 to three phase voltages (U phase, V phase, W phase) and converts three-phase AC power generated in the motor 5 to DC power.

The inverter 4 includes multiple switching elements Tr1 to Tr6, multiple rectifying elements D1 to D6, and a gate drive circuit 41. An arm circuit is formed by connecting an emitter electrode of the switching element Tr1, having a collector electrode connected to a positive electrode of the battery 2, to a collector electrode of the switching element Tr2 having an emitter electrode connected to a negative electrode of the battery 2. A connection point of the switching elements Tr1 (hereafter, referred to as upper arm) and Tr2 (hereafter, referred to as lower arm) forming the arm circuit is connected to a not-illustrated U-phase coil of the motor 5. The rectifying elements D1 and D2 are connected respectively to the upper arm Tr1 and the lower arm Tr2 in an anti-parallel direction.

The upper arms Tr3, Tr5, having collector electrodes connected to the positive electrode of the battery 2, and the lower arms Tr4, Tr6, having collector electrodes connected to the negative electrode of the battery 2, also form arms circuits like the upper arm Tr1 and the lower arm Tr2. The connection points in the respective arm circuits are connected respectively to not-illustrated V-phase coil and W-phase coil of the motor 5. The rectifying elements D3 to D6 are connected to the upper arms Tr3, Tr5 and the lower arms Tr4, Tr6 in the anti-parallel direction.

Gate control signals generated based on a PWM signal outputted by the motor control device 10 are connected to gate electrodes of the switching elements Tr1 to Tr6 forming the inverter 4. A gate control signal GUP is connected to the gate electrode of the upper arm Tr1. A gate control signal GUN is connected to the gate electrode of the lower arm Tr2. Similarly, a gate control signal GVP is connected to the gate electrode of the upper arm Tr3, a gate control signal GVN is connected to the gate electrode of the lower arm Tr4, a gate control signal GWP is connected to the upper arm Tr5, and a gate control signal GWN is connected to the lower arm Tr6.

The gate drive circuit 41 controls ON/OFF of the upper arms Tr1, Tr3, Tr5 and the lower arms Tr2, Tr4, Tr6 at predetermined timing, based on the PWM signal received from the motor control device 10. Signals for ON/OFF control are the gate control signals GUP, GUN, GVP, GVN, GWP, GWN described above. The predetermined timing is a cycle (hereafter, referred to as carrier cycle) of ON/OFF control of the upper and lower arms Tr1 to Tr6.

Moreover, the gate drive circuit 41 detects overheat abnormality and overcurrent abnormality states in the upper and lower arms and outputs an IGBT abnormality signal to the motor control device 10. Furthermore, the gate drive circuit 41 converts a signal from the voltage sensor 9 to a signal with an amplitude level recognizable by the motor control device 10 and outputs the converted signal to the motor control device 10, the voltage sensor 9 configured to detect the voltage of the capacitor 6 which smooths the voltage between the positive electrode and the negative electrode of the inverter 4.

The current sensors 7 output current sensor signals obtained by measuring phase currents flowing respectively through the U-phase coil, the V-phase coil, and the W-phase coil, to the motor control device 10. Note that, since the total of the phase currents flowing through the respective coils is zero, there is no need to provide the current sensors 7 for all three phases.

The motor control device 10 controls a drive voltage supplied to the motor 5 by using the PWM signal. The motor control device 10 generates the PWM signal based on angle information of a not-illustrated rotor of the motor 5, the current sensor signals (Iu, Iv, Iw), a capacitor voltage signal, a control start-stop signal, and a torque instruction value T*. The PWM signal is a signal with the same pulse width and the same amplitude as the gate control signals GUP, GUN, GVP, GVN, GWP, GWN described above. Note that, notation of U, V, W is omitted when it is unnecessary, and the gate control signals are noted as gate control signals GP, GN hereafter.

The motor control device 10 receives the control start-stop signal and the torque instruction value T* from the vehicle control device 13. The vehicle control device 13 includes a CPU, a ROM, and a RAM, and outputs the control start-stop signal in response to the ON operation of the key switch to start drive control of the electric vehicle. Moreover, the vehicle control device 13 calculates the torque instruction value T* based on an accelerator signal, a brake signal, and a shift position signal.

Hereafter, characteristics of the motor control device 10 of the first embodiment are described in detail.

First Embodiment

Figure 2:
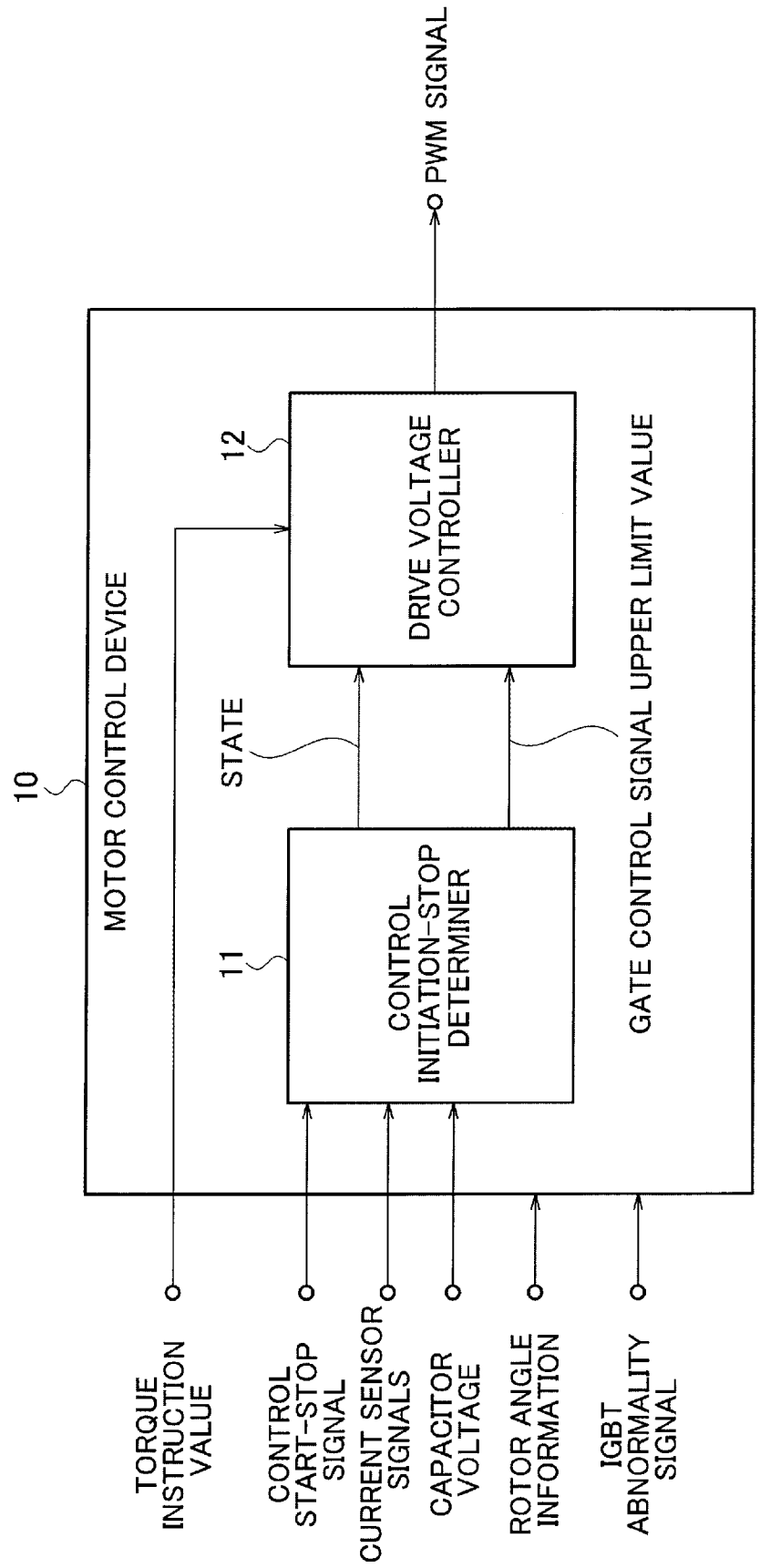
FIG. 2 is a diagram illustrating a functional configuration example of a motor control device 10 in a first embodiment.

The motor control device 10 according to the first embodiment is described with reference to FIG. 2. The motor control device 10 of the embodiment includes a control initiation-stop determiner 11 and a drive voltage controller 12.

The control initiation-stop determiner 11 switches a state of the drive voltage supplied to the motor 5 to a stop state in which the control is stopped, a start state in which the control is executed, or an initiation state. In the "initiation state," the drive voltage controller 12 controls the drive voltage such that the phase currents increase or decrease as the time elapses.

Note that the control initiation-stop determiner 11 performs a control initiation-stop determination step in a motor control method according to the first embodiment. Moreover, the drive voltage controller 12 performs a drive voltage control step in the motor control method.

[Control Initiation-Stop Determiner]

Figure 3:
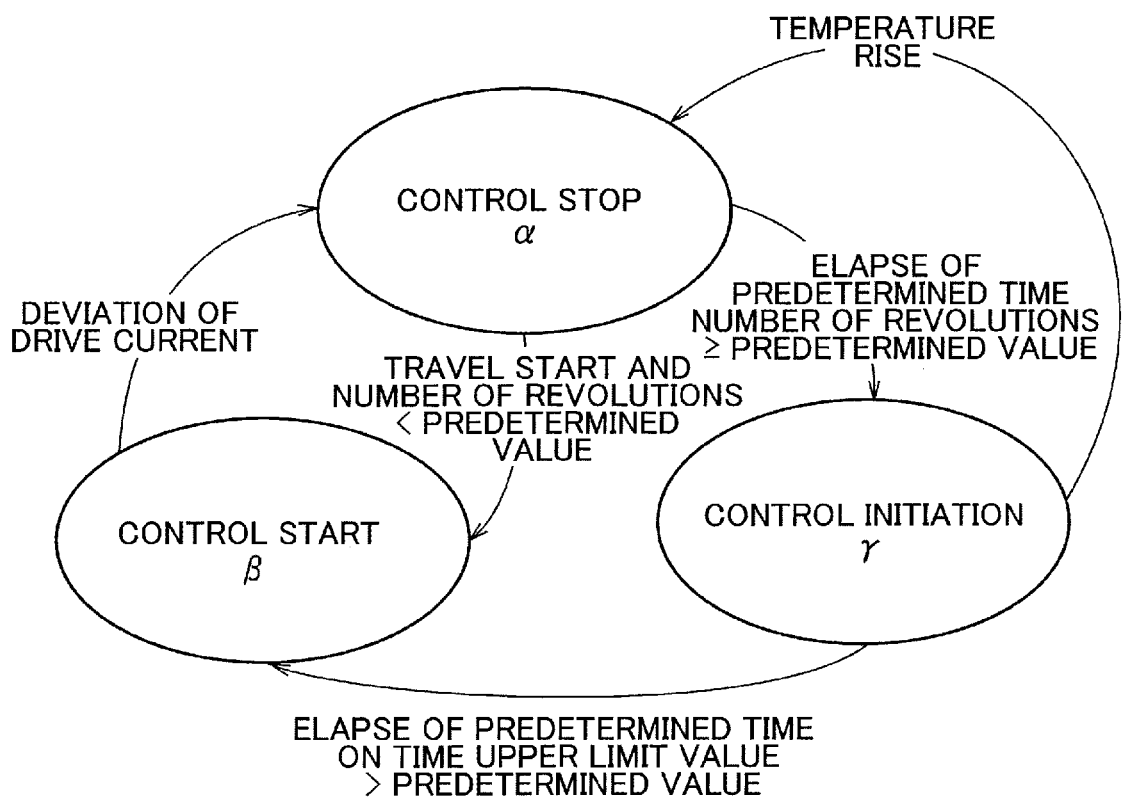
FIG. 3 is a diagram illustrating an example of state transition of the motor control device 10.

FIG. 3 illustrates three states of the control initiation-stop determiner 11 which are "control stop α (stop state)," "control start β (start state)," and "control initiation, γ (initiation state)." The states are described with reference to the state transition diagram of FIG. 3.

The "control stop α" is a state in which the control of the inverter 4 is stopped. The "control stop α" is a state in which the output of the PWM signal is stopped, for example, when the electric vehicle is stopped or when there occurs an abnormality in the phase currents or an abrupt change in the number of revolutions of the motor 5.

The "control start β" is a state in which the inverter 4 is controlled according to the torque instruction value T* during the traveling of the electric vehicle or the like. The "control start β" is a state in which the inverter 4 is controlled by using the PWM signal.

The "control initiation γ" is a state connecting the "control stop α" and the "control start β." The "control initiation γ" is a state in which the inverter 4 is controlled by using a PWM signal different from the PWM signal used in the "control start β."

A state transition from the "control stop α" to the "control start β" is performed when the number of revolutions of the motor 5 is to return to a value lower than a predetermined value. This is because, when the number of revolutions of the motor 5 after the return is lower than the predetermined value, an amount of overshoot is small even without transition to the "control initiation γ." Accordingly, the direct transition from the "control stop α" to the "control start β" is performed. When the control initiation-stop determiner 11 determines to perform transition to the "control start β," the control initiation-stop determiner 11 outputs a state signal indicating the "control start β" to the drive voltage controller 12.

A state transition from the "control start β" to the "control stop α" is performed, for example, when abnormality in the phase currents occurs. When the control initiation-stop determiner 11 determines to perform transition to the "control stop α," the control initiation-stop determiner 11 outputs a state signal indicating the "control stop α" to the drive voltage controller 12.

A state transition from the "control stop α" to the "control initiation γ" is performed when the number of revolutions of the motor 5 is to return to a value higher than the predetermined value. Since the overshoot amount is large when the number of revolutions of the motor 5 after the return is higher than the predetermined value, the transition is performed in this case such that the state returns from the "control stop α" to the "control start β" via the "control initiation γ." When the control initiation-stop determiner 11 determines to perform transition to the "control initiation γ," the control initiation-stop determiner 11 outputs a state signal indicating the "control initiation γ" state to the drive voltage controller 12.

Note that the determination of the state transition from the "control stop α" to the "control initiation γ" can be performed based on multiple pieces of information. For example, the determination is performed based on pieces of information such as the phase currents, the number of revolutions, and the temperatures such that the state transition is performed when changes in the phase currents at the time of resuming the control are large, when the number of revolutions of the motor 5 is equal to or more than the predetermined number of revolutions, when the temperature of the switching elements in the inverter 4 is equal to or more than a threshold, or in similar cases. These pieces of information can be obtained from the current sensor signals, the rotor angle information, and the IGBT abnormality signal. The determination may be performed by using the pieces of information independently or by combining multiple pieces of information. Moreover, the transition from the "control initiation γ" to the "control start β" may also be performed based on the pieces of information.

The state transition from the "control initiation γ" to the "control start β" is performed, for example, when a predetermined time elapses from the moment of transition to the "control initiation γ." Moreover, the state transition is performed when the upper limit value of the gate control signals GP, GN (hereafter, referred to as gate control signal upper limit value) for turning ON the upper and lower arms Tr1 to Tr6 reaches a predetermined value. The gate control signal upper limit value determines the mode (pulse width, amplitude) of the PWM signal.

Figure 4:
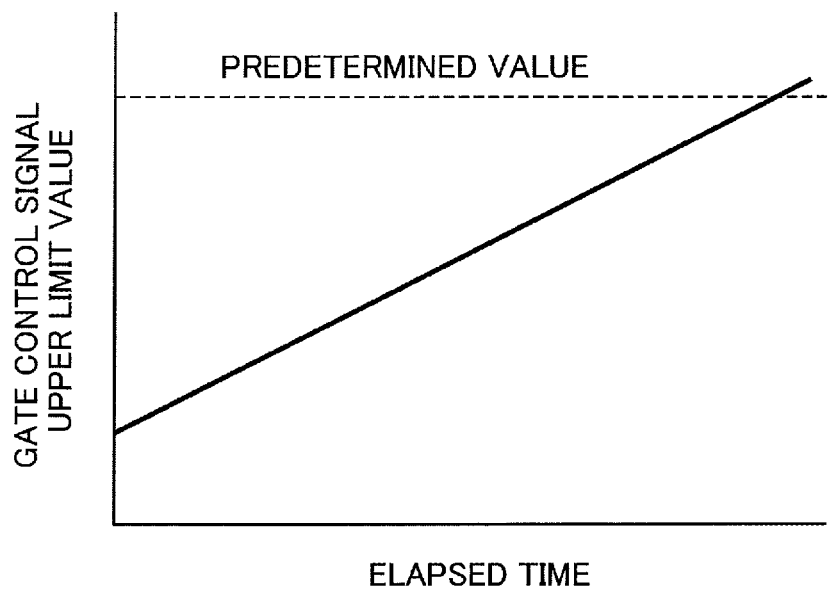
FIG. 4 is a graph illustrating an example of a change of a gate control signal upper limit value in a control initiation state.

The gate control signal upper limit value is outputted from the control initiation-stop determiner 11 to the drive voltage controller 12. FIG. 4 illustrates an example of a change of the gate control signal upper limit value. The horizontal axis of FIG. 4 represents a time elapsed from the transition to the "control initiation γ" and the vertical axis of FIG. 4 represents, for example, the pulse width at the gate control signal upper limit value. In this case, the upper limit value is in one-to-one correspondence with the elapsed time, and means that there is no value greater than the upper limit.

As illustrated in FIG. 4, the pulse width at the gate control signal upper limit value is increased as the time elapses from the transition to the "control initiation γ." The pulse width at the gate control signal upper limit value is increased linearly to, for example, a pulse width (predetermined value) corresponding to a duty ratio of 50% of the carrier cycle of the PWM signal.

[Drive Voltage Controller]

The drive voltage controller 12 generates the PWM signal corresponding to the gate control signal upper limit value. The PWM signal is a signal with the same pulse width and the same amplitude as the gate control signals GP, GN as described above. Accordingly, the motor control device 10 can control the magnitudes of the phase currents of the motor 5 by using the PWM signal.

Note that the drive voltage controller 12 may hold the gate control signal upper limit value. Similar operations can be performed also in this case.

Figure 5:
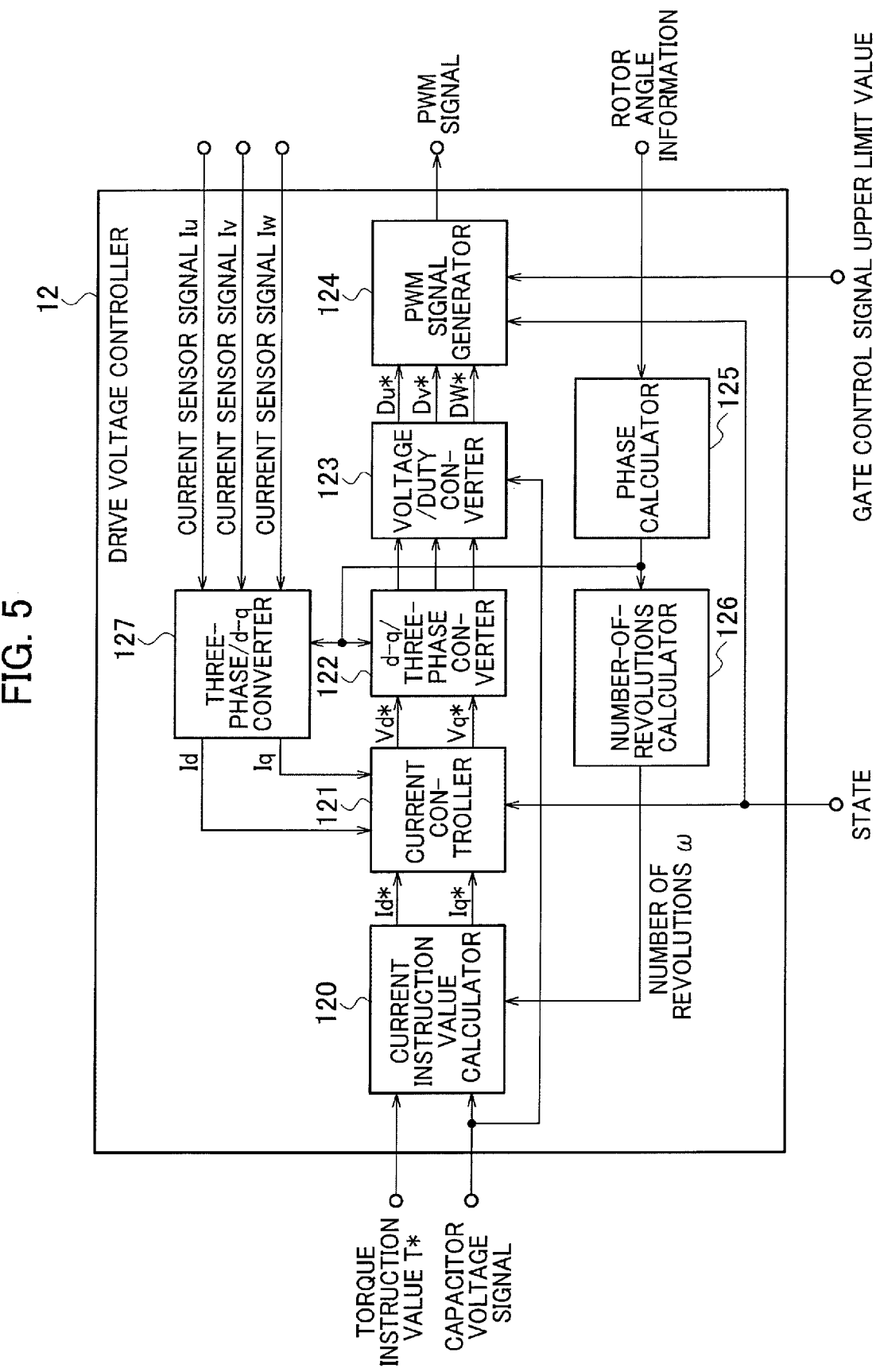
FIG. 5 is a diagram illustrating a functional configuration example of a drive voltage controller 12.

FIG. 5 illustrates a functional configuration example of the drive voltage controller 12, and operations thereof are described in further detail. The drive voltage controller 12 includes a current instruction value calculator 120, a current controller 121, a d-q/three-phase converter 122, a voltage/Duty converter 123, a PWM signal generator 124, a phase calculator 125, a number-of-revolutions calculator 126, and a three-phase/d-q converter 127.

The current instruction value calculator 120 calculates a d-axis current instruction value Id* and a q-axis current instruction value Iq* by using the torque instruction value T* calculated by the vehicle control device 13 and the number of revolutions ω of the motor 5 calculated by the number-of-revolutions calculator 126.

The current controller 121 calculates a d-axis voltage instruction value Vd* and a q-axis voltage instruction value Vq* by using the state signal received from the control initiation-stop determiner 11, the d-axis current instruction value Id*, the q-axis current instruction value Iq*, and a d-axis current Id and a q-axis current Iq received from the three-phase/d-q converter 127. In the "control start" state, Vd* and Vq* are calculated such that Id and Iq follow the Id* and Iq*. In other words, the drive voltages are determined such that the currents measured by the current sensors follow the target currents.

Moreover, in the "control initiation" state, Vd* and Vq* are both set to "0." Specifically, the motor control device 10 of the embodiment minimizes an effect on the phase currents in the transition to the "control initiation" state.

The d-q/three-phase converter 122 converts the d-axis voltage instruction value Vd* and the q-axis voltage instruction value Vq* calculated by the current controller 121 to three-phase AC voltage instruction values Vu*, Vv*, Vw*, based on the rotation phase θ calculated by the phase calculator 125. The three-phase AC voltage instruction values Vu*, Vv*, Vw* obtained by the conversion are outputted to the PWM signal generator 124. The phase calculator 125 calculates the rotation phase θ based on the rotor angle information from the angle sensor 8.

The voltage/Duty converter 123 generates duty signals Du*, Dv*, Dw* which drive the three-phase switching elements, based on the three-phase AC voltage instruction values Vu*, Vv*, Vw* and the capacitor voltage signal being the voltage of the capacitor 6.

The PWM signal generator 124 generates the PWM signal used to control the inverter 4, based on the state signal, the gate control signal upper limit value, and the duty signals Du*, Dv*, Dw*. In this case, the pulse width of the PWM signal is determined by the gate control signal upper limit value. In other words, in the embodiment, the made of the PWM signal and the modes of the gate control signals GP, GN are the same. In the following description, the signals inputted into the gate electrodes of the upper and lower arms Tr1 to Tr6 are referred to as PWM signal.

[PWM Signal in Initiation State]

An operation performed by the drive voltage controller 12 to change the PWM signal is described. Description is given while referring to one phase of the PWM signal in the three states of "control stop," "control initiation," and "control start."

Figure 6:
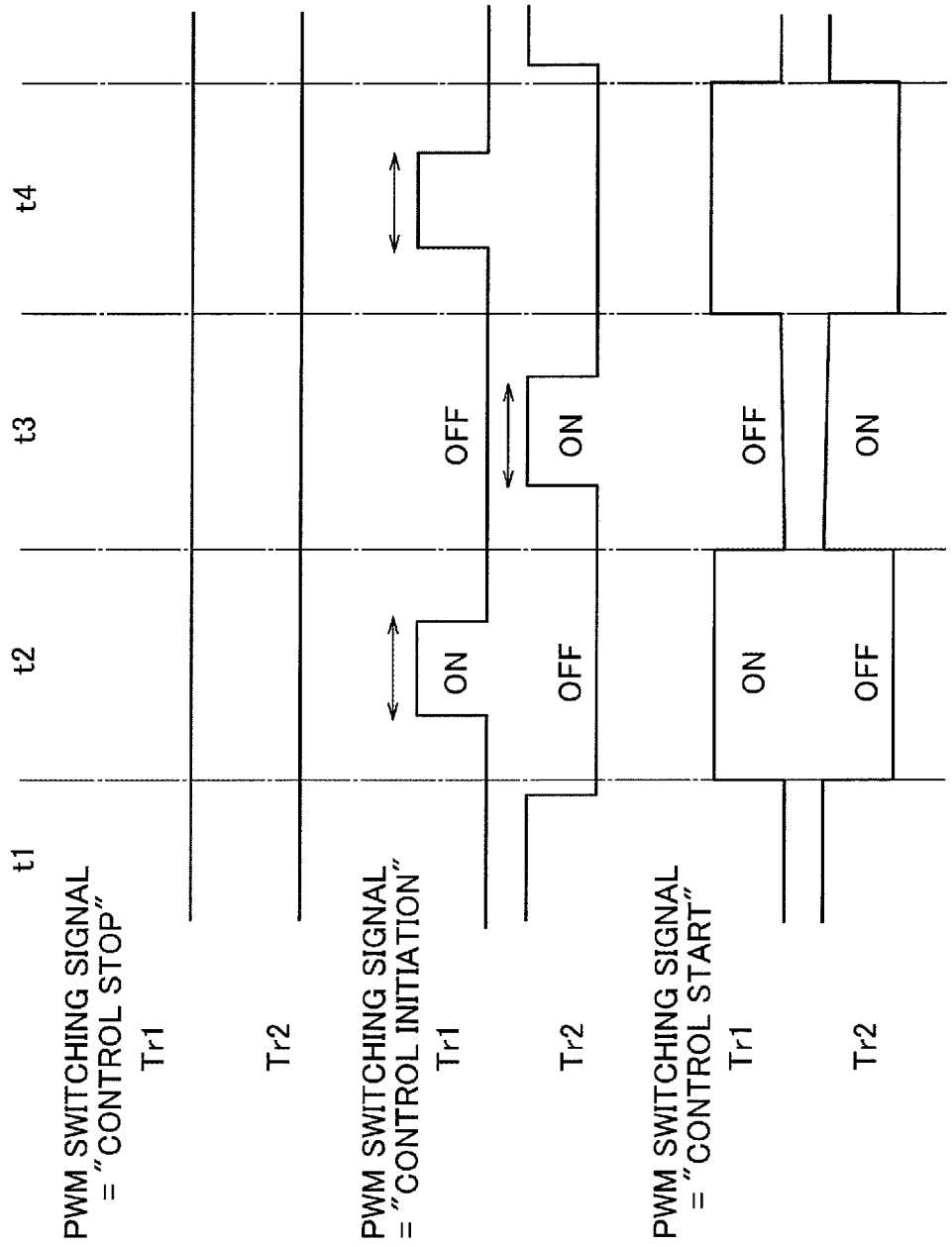
FIG. 6 a diagram illustrating an example of a PWM signal in each of states of control stop, control initiation, and control start.

FIG. 6 is a diagram illustrating the PWM signals for the upper arm Tr1 and the lower arm Tr2 of the U phase. FIG. 6 illustrates the PWM signals for the upper arm Tr1 and the lower arm Tr2 in the states of "control stop," "control initiation," and "control start" from the top. The horizontal direction represents time.

In the "control stop," the upper arm Tr1 and the lower arm Tr2 are both OFF. The upper and lower arms of the other phases are also all OFF. When the electric vehicle is, for example, traveling, the motor 5 is rotating, so even if it is the "control stop" state, counter electromotive force is generated in the motor 5 due to change over time in a magnetic flux interlinking with each phase coil. The phase current based on this counter electromotive force flows into the battery 2 via the rectifying elements D1 to D6 connected in anti-parallel to the upper and lower arms. In this "control stop" state, the motor control device 10 literally does not control the motor 5.

Meanwhile, in the "control start," either the upper arm Tr1 or the lower arm Tr2 is always set to the ON state. Control of supplying a desired phase current to the motor 5 is performed by turning on and off the upper and lower arms such that the either one is always set to the ON state in the "control start".

The "control initiation" is the state connecting the "control stop" and the "control start." In the "control initiation," the PWM signals for the upper arm Tr1 and the lower arm Tr2 are changed such that the upper limit value of the phase current increases as the time elapses. For example, the pulse width of the PWM signal is gradually increased as the time elapses. As a result, the maximum value (upper limit value) of the amplitude of the phase current can be gradually increased. This is the same for the other phases.

The ON duration of the lower arm Tr2 in time t3 is longer than the ON duration of the upper arm Tr1 in time t2. Moreover, the ON duration of the upper arm tr1 in time t4 is longer than the ON duration of the lower arm Tr2 in the time t3. In other words, the pulse width of each PWM signal increases depending on the change of the gate control signal upper limit value in FIG. 4. Then, when the pulse width of each PWM signal increases to a predetermined value, the state transitions to the "control start."

Figure 7:
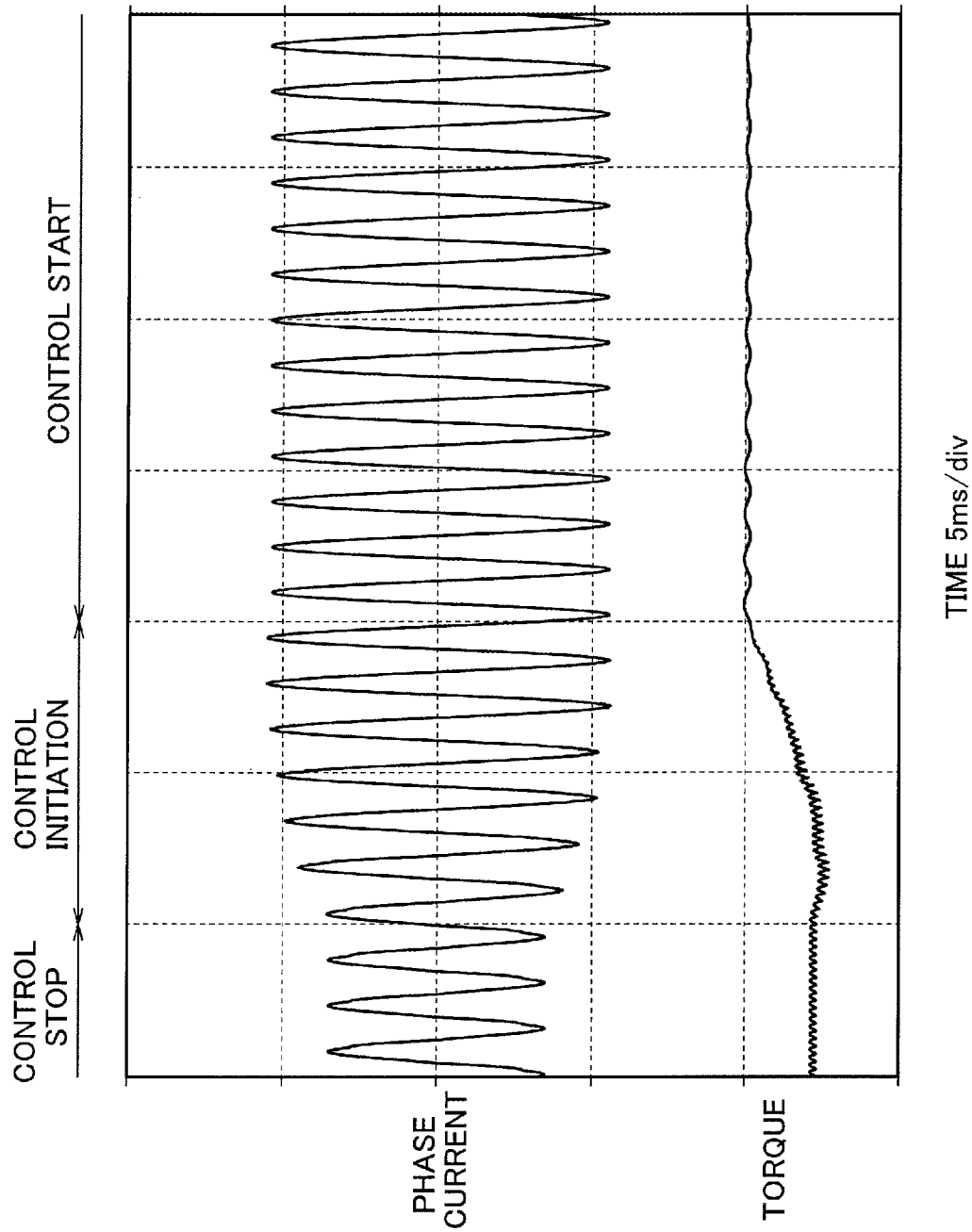
FIG. 7 is a graph illustrating an example of a change of a phase current in the case where the motor control device 10 controls a motor 5.

Providing the "control initiation" state described above reduces the overshoot of the phase current in the motor 5. FIG. 7 illustrates a result of simulation of the phase current in the case where the motor control device 10 of the embodiment controls the motor 5. FIG. 7 illustrates changes in the phase current and the torque over time in the case where the state transitions from the "control stop" to the "control initiation" and then to the "control start."

As illustrated in FIG. 7, the amplitude of the phase current in the "control initiation" state gradually increases as the time elapses. As described above, the drive voltage controller 12 controls the drive voltage supplied to the motor 5 such that the maximum value (upper limit value) of the amplitude of the phase current gradually increases.

Figure 8:
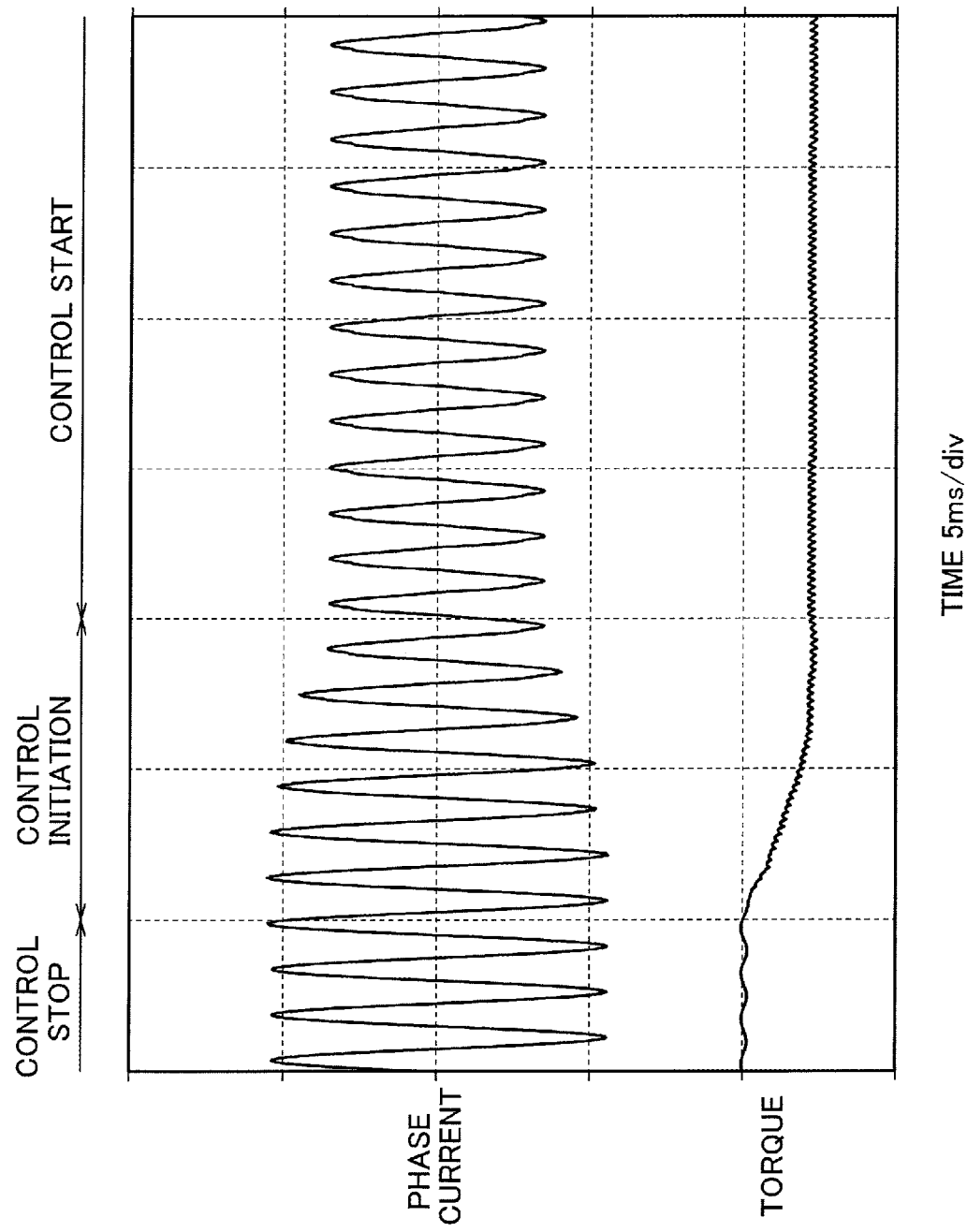
FIG. 8 is a graph illustrating another example of the change of the phase current in the case where the motor control device 10 controls the motor 5.

Moreover, when the phase current in the "control stop" state is high, the drive voltage controller 12 controls the drive voltage such that the maximum value (upper limit value) of the amplitude of the phase current gradually decreases as the time elapses. FIG. 8 illustrates a simulation result of the case where the phase current is reduced.

The drive voltage controller 12 reduces the overshoot and the undershoot of the phase current as described above. The change mode of the maximum value (upper limit value) of the phase current amplitude is determined by the gate control signal upper limit value outputted by the control initiation-stop determiner 11.

The following operations and effects can be obtained from the motor control device 10 of the first embodiment described above.

In the "control initiation" state, since the pulse width of the PWM signal gradually increases, no abrupt change occurs in the phase of the phase current. As a result, it is possible to suppress abrupt rise (fall) of the phase current which is called secondary vibration system.

In the "control initiation" state, the control is performed such that the upper limit of the phase current increases as the time elapses (FIGS. 7 and 8). The motor control device 10 of the embodiment thus prevents occurrence of device failure due to an excessive current. Moreover, the motor control device 10 also prevents torque fluctuation.

Figure 9:
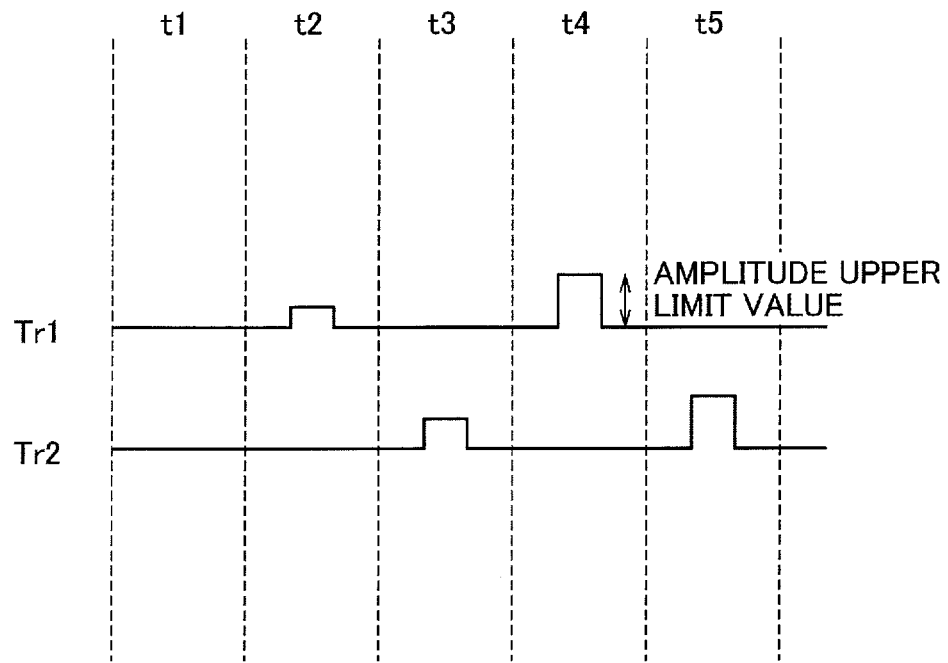
FIG. 9 is a diagram illustrating an example in which the amplitude of the PWM signal is increased in the initiation state.

In the example described above, although description is given by using the example in which the pulse width of the PWM signal is increased as the time elapses, the amplitude of the PWM signal may be increased as the time elapses. FIG. 9 illustrates an example in which the amplitude of the PWM signal is increased in the "control initiation" state as the time elapses. When the state of the drive voltage transitions to the "control initiation" state, the amplitude of the PWM signal for each of the upper arm Tr1 and the lower arm Tr2 increases to match an amplitude upper limit value determined for each elapsed time. The same applies to the P phase and the W phase.

A motor control device having the same effects as in the aforementioned case of controlling the pulse width can be achieved also by changing the amplitude of the PWM signal as described above. Moreover, similar effects can be obtained also by changing both of the pulse width and the amplitude simultaneously.

Figure 10:
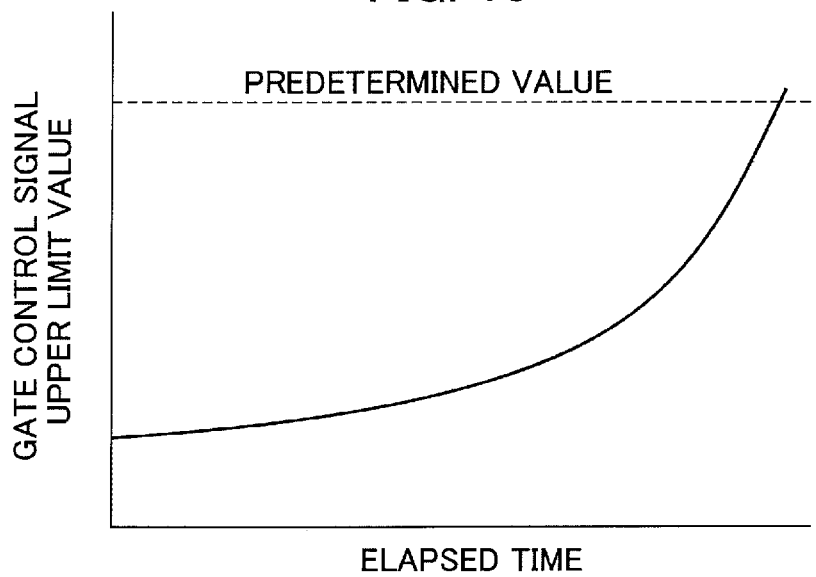
FIG. 10 is a graph illustrating another example of the change of the gate control signal upper limit value in the control initiation state.

Moreover, in the example described above, although description is given by using the example in which the gate control signal upper limit value for changing the PWM signal is linearly changed at a fixed change rate, the change rate may be gradually increased as illustrated in FIG. 10. The vertical and horizontal axes in FIG. 10 are the same as those in FIG. 4.

The change of the phase current in the "control initiation" state can be made smoother by increasing the change rate of the gate control signal upper limit value as the time elapses as illustrated in FIG. 10. As a result, abrupt rise (fall) of the phase current can be surely reduced.

Furthermore, description is given by using the example in which the state transition to the "control stop" state is performed when an excessive phase current flows due to unexpected disturbance and deviation between the target value and the measurement value (current sensor signal) of the phase current thus increases. However, the state can be more simply transitioned to the "control stop." For example, the control initiation-stop determiner 11 may be configured to switch to the "control stop" when a phase current exceeds a threshold.

Figure 11:
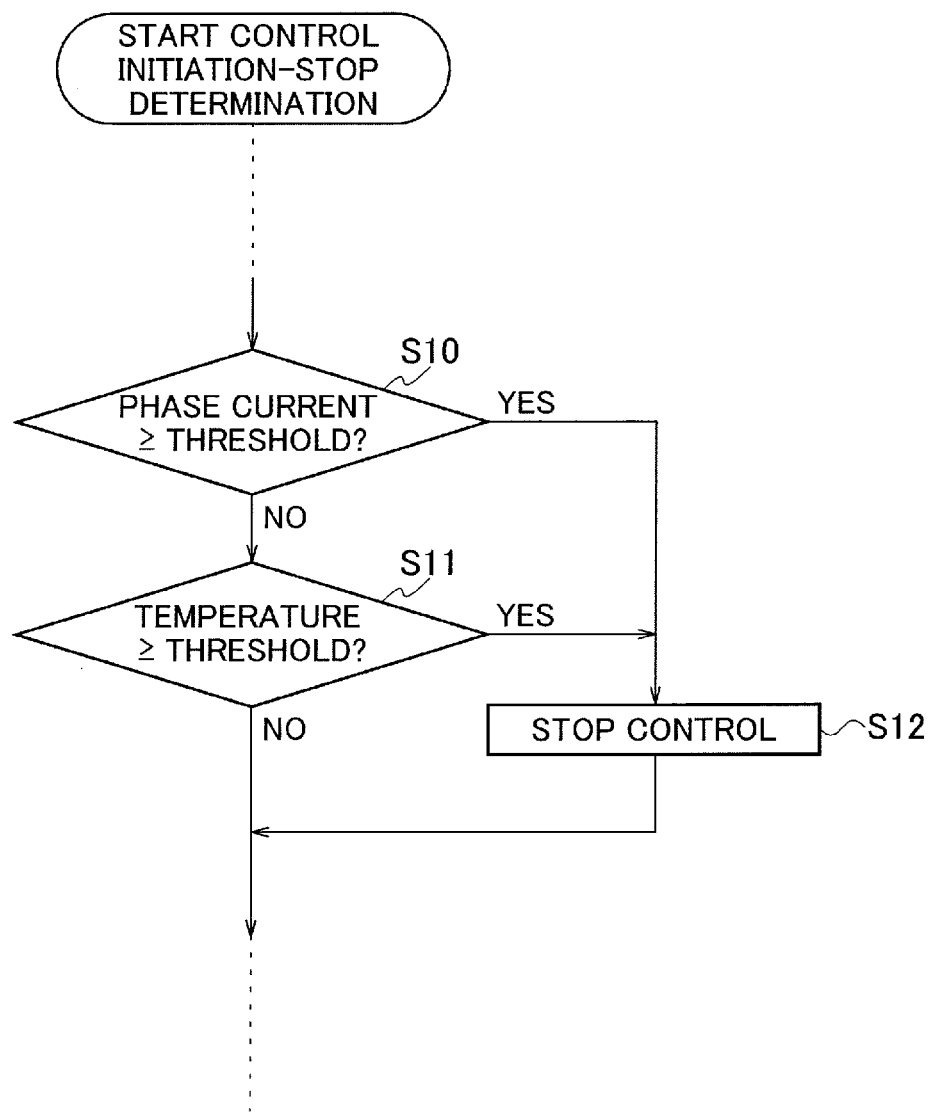
FIG. 11 is a diagram illustrating part of an operation flow in which a control initiation-stop determiner 11 performs determination on the "control stop" state.

FIG. 11 illustrates an operation flow in which the control initiation-stop determiner 11 switches the state of the drive voltage to the "control stop" state when the phase current exceeds the threshold and when the temperature of the switching elements Tr1 to Tr6 exceeds a threshold. When the measurement value of the phase current reaches or exceeds the threshold (YES in step S10), the state of the drive voltage is transitioned to the "control stop" state. Moreover, when the temperature of the switching elements Tr1 to Tr6 reaches or exceeds the threshold (YES in step S11), the state of the drive voltage is transitioned to the "control stop" state.

The determination of step S10 may be performed by using the phase current obtained from each current sensor or by using values such as a current instruction value instructing the aforementioned target value. A motor control device which can detect an abnormal state of the PWM control more quickly and stop the PWM control accurately can be achieved by performing transition to the "control stop" state based on the phase current.

Note that the temperature of the switching elements Tr1 to Tr6 exceeding the threshold can be detected by using, for example, the aforementioned IGBT abnormality signal. A motor control device which can prevent failure of the switching elements can be achieved by detecting an abnormal state of the PWM control based on whether the temperature of the switching elements has exceeded the threshold or not.

Actively stopping the PWM control when abnormality in the phase current or the temperature is detected as described above can also suppress energy consumption. In other words, wasteful consumption of energy can also be prevented.

Figure 12:
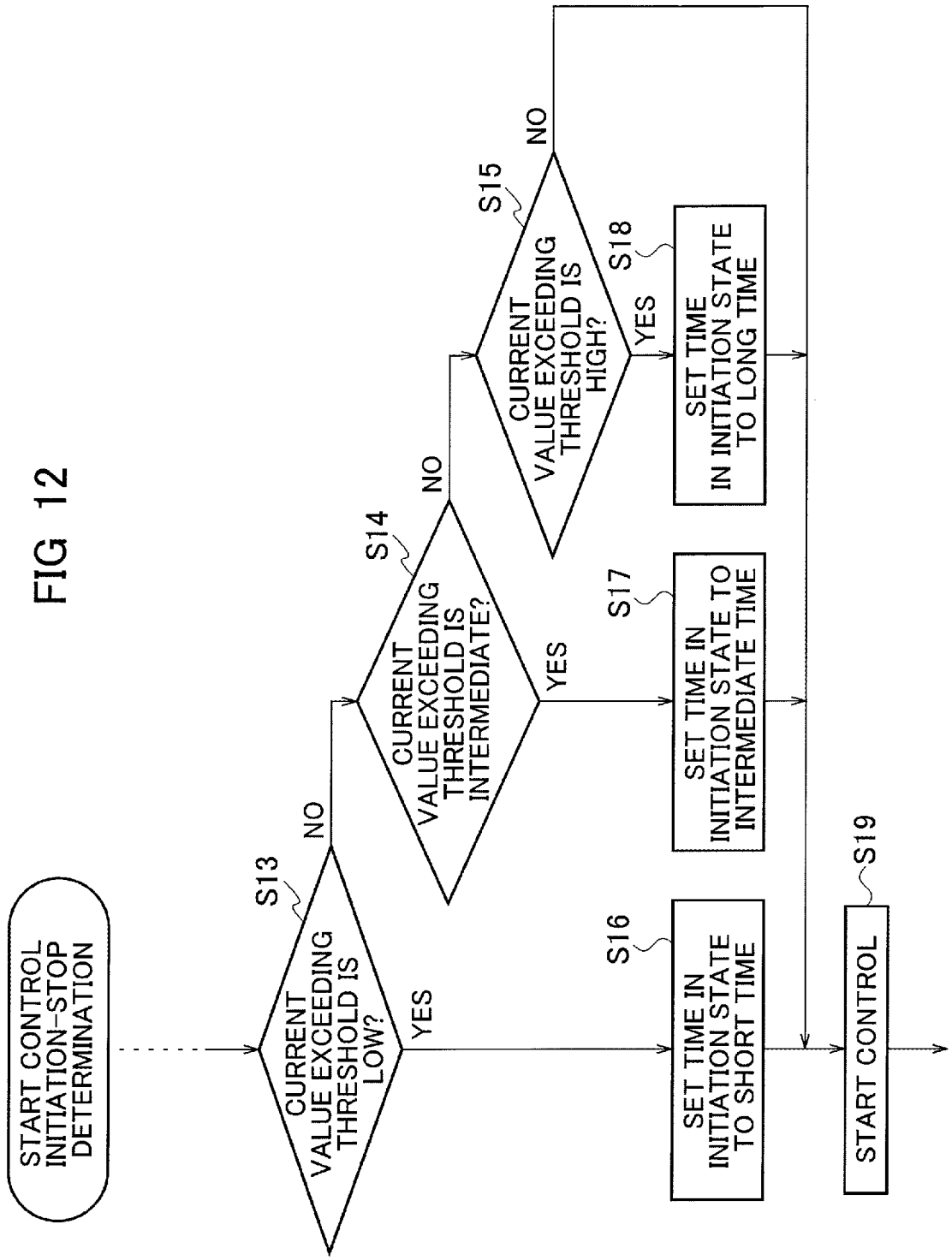
FIG. 12 is a diagram illustrating part of an operation flow in which a control initiation-stop determiner 11 performs determination on the "control start" state.

Moreover, the control initiation-stop determiner 11 may be configured to set the duration of the "control initiation" state such that the larger the phase current exceeding the threshold is the longer the duration of the "control initiation" state is. FIG. 12 illustrates an operation flow in which the length of the duration of the "control initiation" state is changed depending on the magnitude of the phase current exceeding the threshold.

When the current value of the phase current exceeding the threshold is low (YES in step S13), the duration in which the state of the drive voltage is set to the "control initiation" state is short (step S16). When the current value of the phase current exceeding the threshold is an intermediate level (YES in step S14), the duration in which the state of the drive voltage is set to the "control initiation" state is an intermediate length (step S16). When the current value of the phase current exceeding the threshold is high (YES in step S15), the duration in which the state of the drive voltage is set to the "control initiation" state is long (step S18).

Generally, the larger the phase current flowing in the motor is, the worse the level of abnormality in the PWM control is. Accordingly, the transition to the "control start" state needs to be performed more carefully. By achieving a configuration in which the duration in the "control initiation state" is set such that the larger the phase current exceeding the threshold is, the longer the duration in the "control initiation state" is, the time taken to resume the PWM control can be set such that the higher the phase current is, the longer the time taken to resume the PWM control is. Accordingly, a motor control device which can stabilize the resuming of the PWM control can be achieved.

Note that the same applies to the temperature. An operation flow in the case of the temperature is the same as that in FIG. 12. Generally, the higher the temperature of the switching elements is, the worse the level of the abnormality in the PWM control is. Accordingly, a motor control device which can stabilize the resuming of the PWM control can be achieved by setting the time taken to transition to the "control start" state such that the higher the temperature of the switching elements is, the longer the time taken to transition to the "control start" state is.

Second Embodiment

Figure 13:
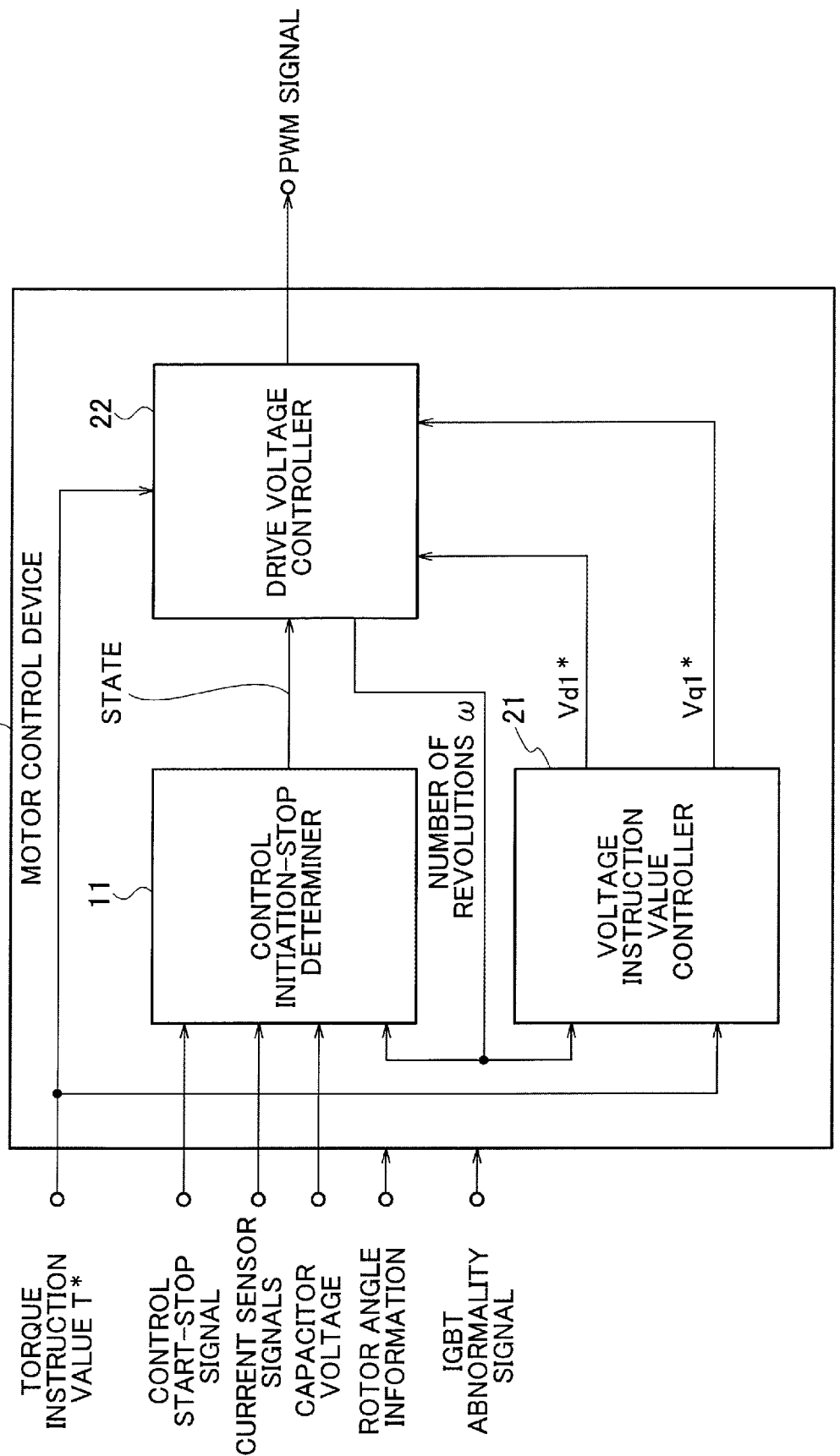
FIG. 13 is a diagram illustrating a functional configuration example of a motor control device 20 in a second embodiment.

Description is given of a motor control device 20 according to a second embodiment with reference to FIG. 13. The motor control device 20 of the embodiment is different from the motor control device 10 (FIG. 2) in that the motor control device 20 includes a voltage instruction value controller 21 configured to control voltage instruction values in the "control stop" state. Moreover, a drive voltage controller 22 is different from the drive voltage controller 12 in that the drive voltage controller 22 generates the PWM signal by using these voltage instruction values (outputs of the voltage instruction value controller 21).

The voltage instruction value controller 21 fixes each of the voltage instruction values instructing increase or decrease of the phase currents to a predetermined value in the "control stop" state. Specifically, since the voltage instruction value is fixed to the predetermined value while the PWM control is stopped, fluctuation of the motor torque in the transition from the "control stop" state to the "control initiation" state can be suppressed.

Figure 14:
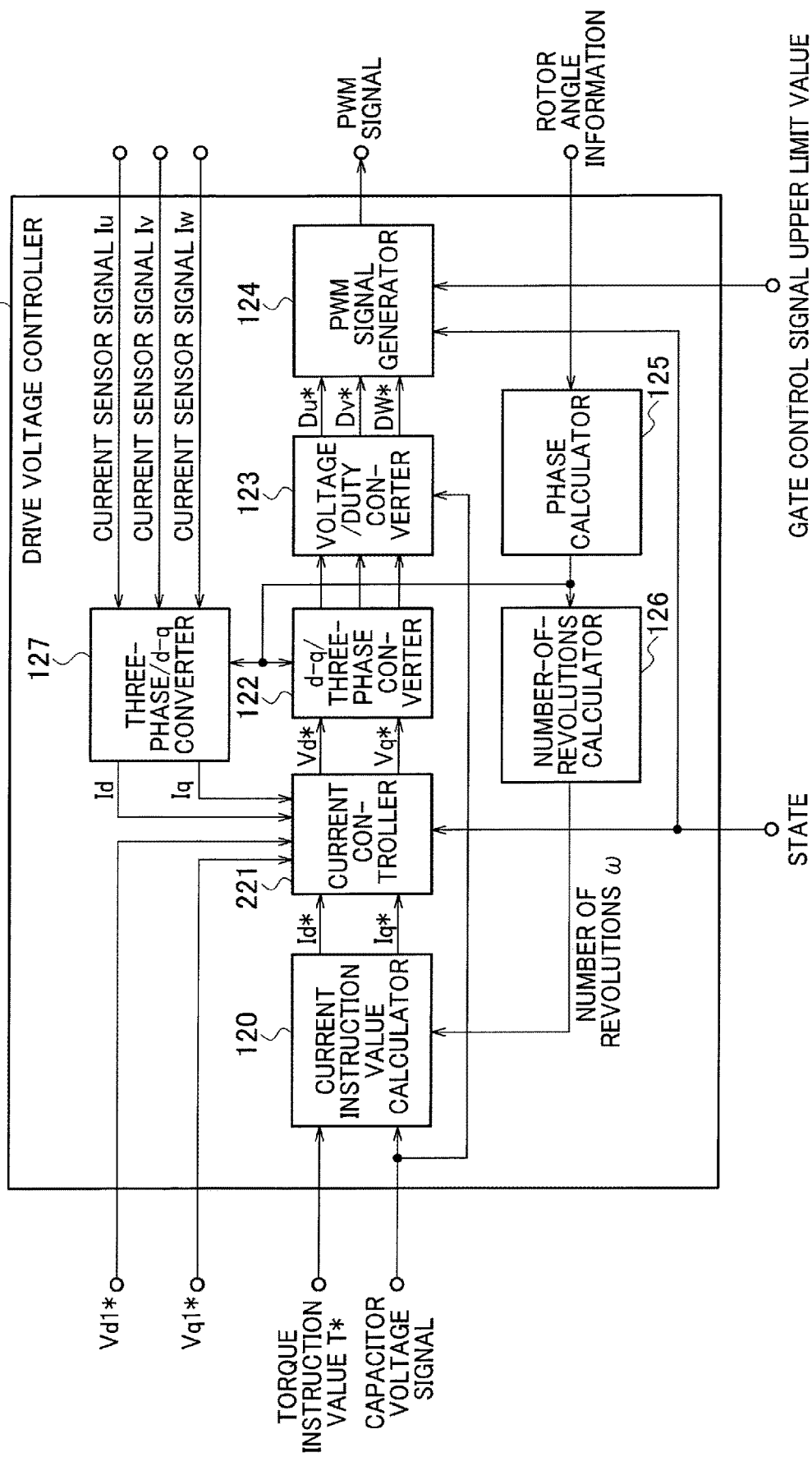
FIG. 14 is a diagram illustrating a functional configuration example of a drive voltage controller 22.

FIG. 14 illustrates a functional configuration example of the drive voltage controller 22. The drive voltage controller 22 is different from the drive voltage controller 12 (FIG. 5) only in that the drive voltage controller 22 includes a current controller 221.

In the current controller 121, the voltage instruction value in the period when the PWM control is stopped is set to "0." In the current controller 221, the state signal fixes the voltage instruction value in the "control stop" to the predetermined value.

The predetermined value may be, for example, a d-axis voltage instruction value Vd1* and a q-axis voltage command value Vq1* newly calculated based on the torque instruction value T*, the number of revolutions ω, and the capacitor voltage in the "control stop" state. Newly calculating the values allows the motor torque to follow the target value more quickly even when the duration of the "control stop" state is long.

Figure 15:
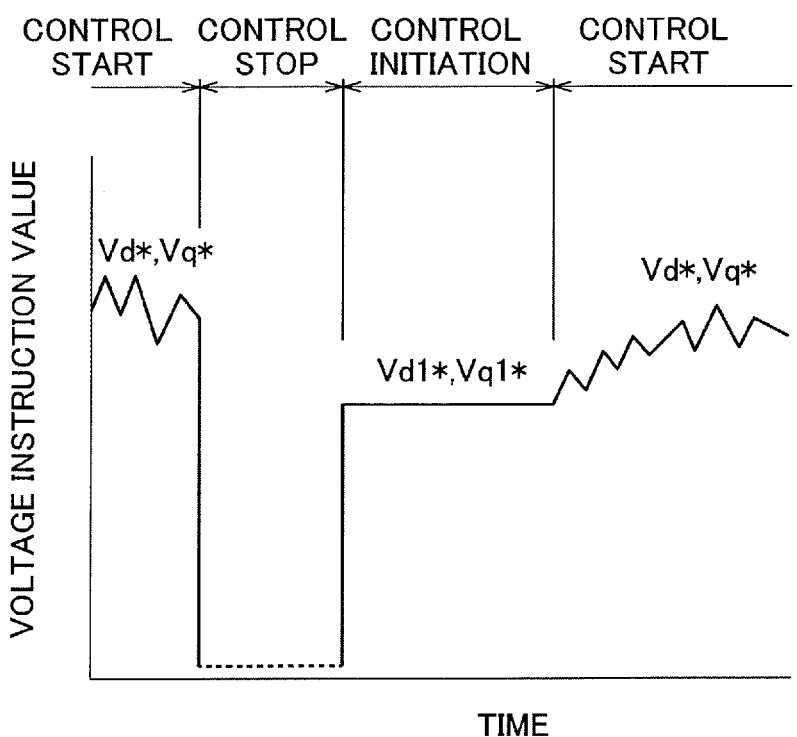
FIG. 15 is a graph illustrating an example of Vd1* and Vq1* calculated by a voltage instruction value controller 21.

FIG. 15 schematically illustrates a relationship between the voltage instruction value and each of the states in the case where the new voltage instruction values Vd1*, Vq1* are calculated in the "control stop" state. The horizontal axis represents time and the vertical axis represents the voltage instruction value.

The voltage instruction value controller calculates the new d-axis voltage instruction value Vd1* and the new q-axis voltage command value Vq1* in the "control stop" state, and inputs these values into the current controller 221. As a result, fluctuation of the motor torque in the transition to the "control initiation" state can be suppressed even when the "control stop" state is infinitely long as illustrated by the broken line.

Modified Example 1

Moreover, the predetermined value may be the voltage instruction value held by the voltage instruction value controller 21 just before the transition to the "control stop" state. A relationship between the voltage instruction value and each state in this case is illustrated in FIG. 16.

Figure 16:
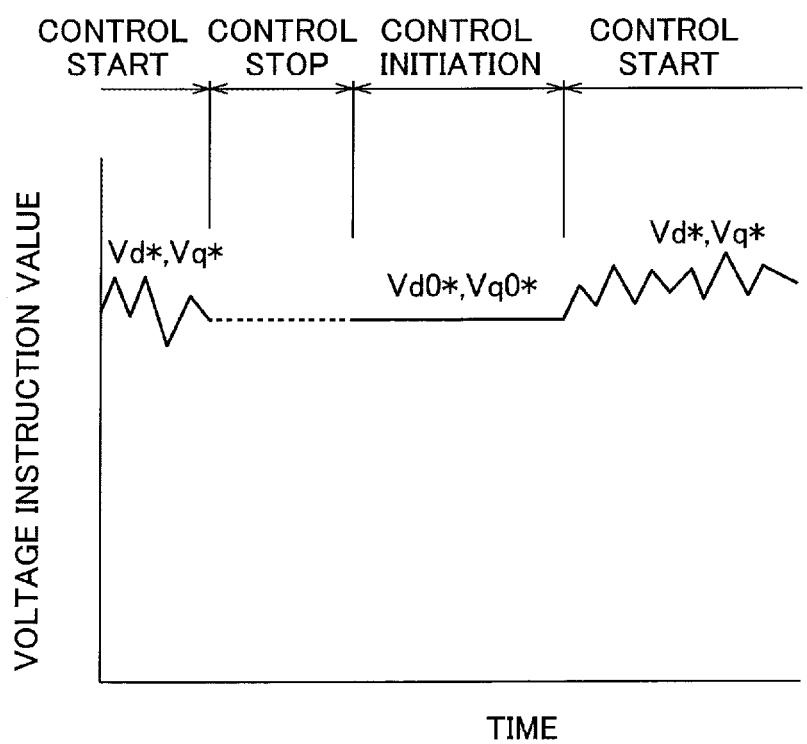
FIG. 16 is a graph illustrating another example of Vd1* and Vq1* calculated by the voltage instruction value controller 21.

The horizontal axis and the vertical axis of FIG. 16 are the same as those of FIG. 15. The voltage instruction value controller 21 holds Vd* and Vq* just before the transition to the "control stop" state as Vd0* and Vq0*. The voltage instruction values thus held are inputted into the current controller 221 when the state transitions to the "control initiation" state to suppress fluctuation of the motor torque. This method is effective when the duration of the "control stop" state is relatively short.

Modified Example 2

Moreover, the predetermined value may be set, depending on the length of the duration of the "control stop" state, to a value between the voltage instruction value Vd0*, Vq0* held just before the transition to the "control stop" state and the voltage instruction value Vd1*, Vq1* newly calculated by using the torque instruction value T* required for the torque control.

Figure 17:
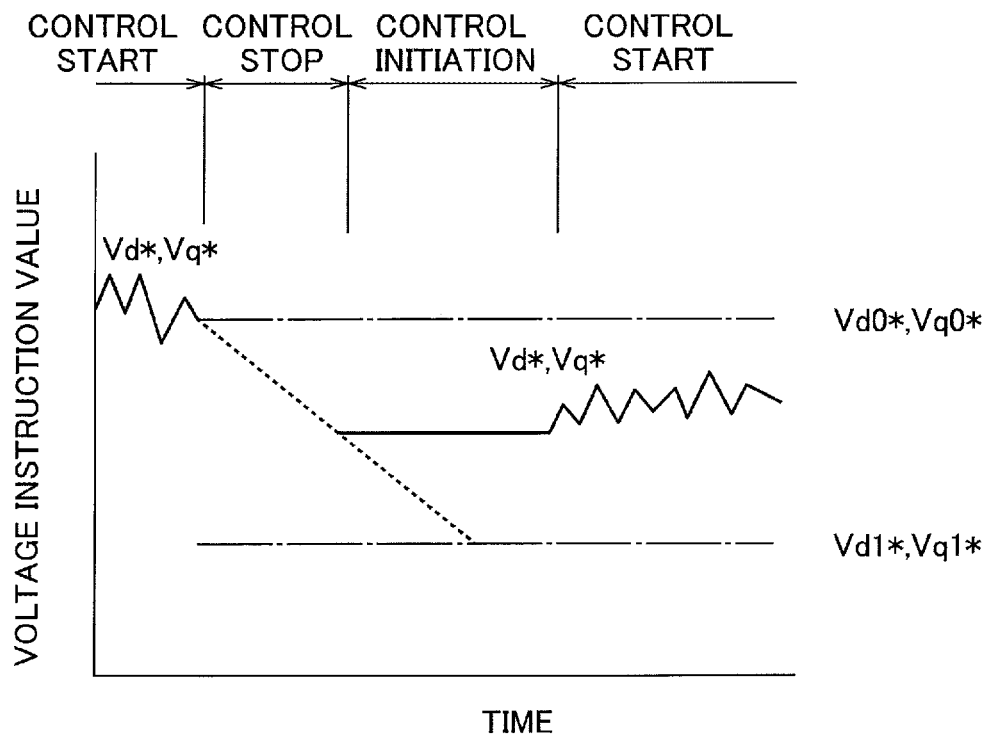
FIG. 17 is a graph illustrating yet another example of Vd1* and Vq1* calculated by the voltage instruction value controller 21.

FIG. 17 schematically illustrates a relationship between the voltage instruction value and each state in the case where the predetermined value is set to a value between the held voltage instruction value Vd0*, Vq0* and the newly-calculated voltage instruction value Vd1*, Vq1*. The horizontal axis and the vertical axis of FIG. 17 are the same as those of FIG. 15.

The voltage command values Vd* and Vq* in the transition to the "control stop" state are each set to a value between Vd0*, Vq0* and Vd1*, Vq1* depending on the length of the duration of the "control stop" state. Depending on the length of the time means that, as illustrated in FIG. 17, the duration of the "control stop" state in the case of using newly-calculated Vd1*, Vq1* is determined in advance and the value is determined from the proportional relationship between this time and the actual duration of the "control stop" state.

As described above, the predetermined value is set, depending on the length of the duration of the "control stop" state, to a value between Vd0*, Vq0* held by the voltage instruction value controller 21 just before the transition to the "control stop" state and newly-calculated Vd1*, Vq1* required for the torque control. As a result, it is possible to appropriately set the voltage instruction value and suppress fluctuation of the motor torque in the transition to the "control initiation" state.

As described above, the motor control device 20 of the second embodiment can suppress fluctuation of the motor torque in the transition from the "control stop" state to the "control initiation" state. Suppressing the fluctuation of the motor torque can prevent occurrence of vibration based on torque fluctuation.

Figure 18:
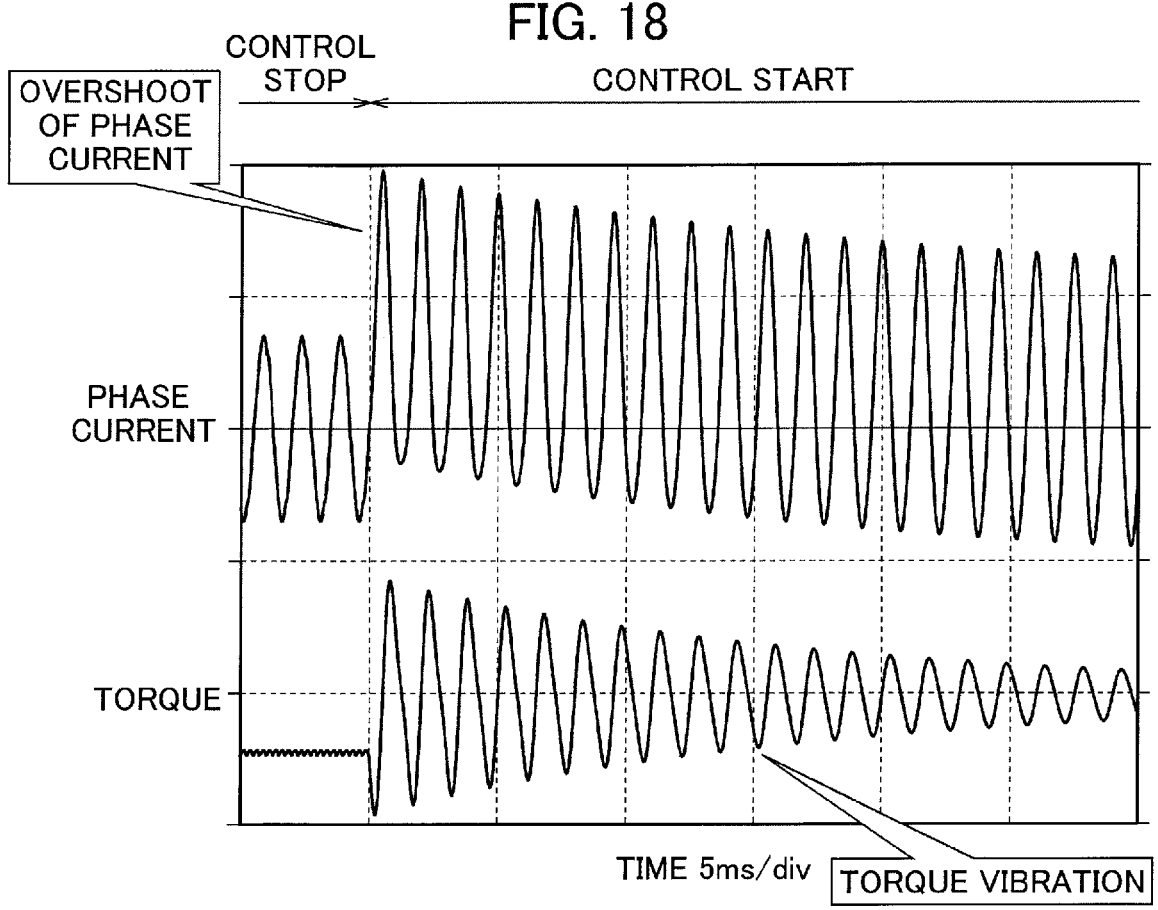
FIG. 18 is a graph illustrating an example of the change of the phase current in the case where a motor control device according to a comparative example controls the motor 5.

FIG. 18 illustrates changes in the phase current and the torque over time in the case where the motor 5 is driven by a motor control device of a comparative example and the state is transitioned from the "control stop" state to the "control start" state. The horizontal axis and the vertical axis of FIG. 17 are the same as those of FIG. 7.

In the change over time in the comparative example of FIG. 18, the aforementioned "control initiation" state does not exist. In other words, the state transitions from the "control stop" state to the "control start" state. Since the pulse width of the PWM signal at the time when the PWM control is resumed is the same as that in the normal PWM control state and is large, overshoot may occur in the phase current depending on the number of revolutions of the motor. As a result, the vibration occurs in the motor torque.

In the comparative example (FIG. 18), the torque vibration occurs as soon as the state transitions from the "control stop" state to the "control start" state. The vibration continues for 30 ms or more. When the motor 5 is driven by the motor control device 10 of the first embodiment, no vibration occurs in the same situation (FIG. 7).

The motor control devices 10 and 20 in the embodiments control the drive voltage such that each phase current increases or decreases as the time elapses in the situation where the state of the drive voltage is the initiation state. Accordingly, the motor control devices 10 and 20 can reduce overshoot of the phase current and suppress vibration occurring in the motor torque in the case where the PWM control is resumed.

Note that, in aforementioned FIG. 6, description is given by using the example in which the PWM signals for the upper arm Tr1 and the lower arm Tr2 in the "control start" state are signals opposite to each other. However, in practice, dead time in which the upper arm Tr1 and the lower arm Tr2 are simultaneously set to OFF is generally provided in each carrier cycle to prevent a through current flowing through the arm circuit. In the description of the embodiments, an illustration of the dead time is omitted to simplify the description.

Moreover, in the embodiments, although description is given by using the example in which the pulse width of the PWM signal is increased, a motor control device having similar effects can be achieved by employing a method of reducing the aforementioned dead time. Moreover, similar effects can be also obtained by changing the carrier cycle.

Furthermore, in the aforementioned embodiments, although description is given by using the example in which the motor 5 is the three-phase permanent magnet synchronous electric motor for driving the electric vehicle, the present invention is not limited to this example. The technical idea described in the aforementioned embodiments can be applied not only to a motor for driving (traveling) but also to a wide variety of motors such as an actuator.

Although the embodiments of the present invention are described above, it should not be understood that the description and drawings forming part of this disclosure limit the present invention. From this disclosure, various alternative embodiments, examples, and operation techniques will be found by those skilled in the art.

REFERENCE SIGNS LIST 1 drive power supply device
2 battery
3, 14 relay units
4 inverter
5 motor
6 capacitor
7 current sensor
8 angle sensor
9 voltage sensor
10 motor control device
11 control initiation-stop determiner
12 drive voltage controller
13 vehicle control device
20 motor control device
21 voltage instruction value controller
22 drive voltage controller

The invention claimed is:

1. A motor control device which controls a phase current of a motor by using a drive voltage supplied to the motor, comprising
a control initiation-stop determiner configured to switch a state of the drive voltage to a stop state in which a control is stopped, a start state in which the control is executed, or an initiation state; and
a drive voltage controller configured to control the drive voltage based on the state switched by the control initiation-stop determiner, wherein
when the state of the drive voltage is to be transitioned from the stop state to the start state, the control initiation-stop determiner switches the state of the drive voltage to the initiation state during the transition from the stop state to the start state,
the drive voltage controller controls the drive voltage such that the phase current increases or decreases in the initiation state as time elapses, and
the control initiation-stop determiner switches the state of the drive voltage to the stop state when the phase current exceeds a threshold,
wherein the control initiation-stop determiner sets a duration of the initiation state based on a value of the phase current exceeding the threshold such that a first duration set based on a first value of the phase current that is larger than a second value of the phase current is longer than a second duration set based on the second value.

2. The motor control device according to claim 1, wherein the drive voltage controller
uses a PWM signal to execute PWM control of controlling the drive voltage supplied to the motor, and
controls a pulse width of the PWM signal such that the phase current increases or decreases in the initiation state as the time elapses.

3. The motor control device according to claim 1, wherein the drive voltage controller
uses a PWM signal to execute PWM control of controlling the drive voltage supplied to the motor, and
controls an amplitude of the PWM signal such that an upper limit value of the phase current increases or decreases in the initiation state as the time elapses.

4. The motor control device according to claim 1, wherein the drive voltage controller
uses a PWM signal to execute PWM control of controlling the drive voltage supplied to the motor, and
controls a change rate of the PWM signal such that an upper limit value of the phase current increases or decreases in the initiation state as the time elapses.

5. The motor control device according to claim 1, comprising a voltage instruction value controller configured to fix a voltage instruction value instructing increase or decrease of the drive voltage to a predetermined value in the stop state.

6. The motor control device according to claim 5, wherein the predetermined value is set to a value newly calculated by using a torque instruction value required for torque control.

7. The motor control device according to claim 5, wherein the predetermined value is set to the voltage instruction value held by the voltage instruction value controller just before transition to the stop state.

8. The motor control device according to claim 5, wherein the predetermined value is set, depending on a length of a duration of the stop state, to a value between the voltage instruction value held by the voltage instruction value controller just before transition to the stop state and a voltage instruction value newly calculated by using a torque instruction value required for torque control.

9. A motor control device which controls a phase current of a motor by using a drive voltage supplied to the motor, comprising
a control initiation-stop determiner configured to switch a state of the drive voltage to a stop state in which a control is stopped, a start state in which the control is executed, or an initiation state; and
a drive voltage controller configured to control the drive voltage based on the state switched by the control initiation-stop determiner, wherein
when the state of the drive voltage is to be transitioned from the stop state to the start state, the control initiation-stop determiner switches the state of the drive voltage to the initiation state during the transition from the stop state to the start state,
the drive voltage controller controls the drive voltage such that the phase current increases or decreases in the initiation state as time elapses,
the control initiation-stop determiner switches the state of the drive voltage to the stop state when temperature of a switching element configured to generate the drive voltage exceeds a threshold, and
the control initiation-stop determiner sets a duration of the initiation state based on a value of the temperature exceeding the threshold such that a first duration set based on a first value of the temperature that is larger than a second value of the temperature is longer than a second duration set based on the second value.

10. The motor control device according to claim 9, wherein the control initiation-stop determiner sets the duration of the initiation state such that the higher the temperature exceeding the threshold is, the longer the duration of the initiation state is.

11. A motor control method performed by a motor control device which controls a phase current of a motor by using drive voltage supplied to the motor, comprising:
a control initiation-stop determination step of switching a state of the drive voltage to a stop state in which a control is stopped, a start state in which the control is executed, or an initiation state; and
a drive voltage control step of controlling the drive voltage based on the state switched by the control initiation-stop determination step, wherein
in the control initiation-stop determination step, when the state of the drive voltage is to be transitioned from the stop state to the start state, the state of the drive voltage is switched to the initiation state during the transition from the stop state to the start state,
in the drive voltage control step, the drive voltage is controlled such that the phase current increases or decreases in the initiation state as time elapses, and
in the control initiation-stop determination step, the state of the drive voltage is switched to the stop state when the phase current exceeds a threshold,
wherein in the control initiation-stop determination step, a duration of the initiation state is set based on a value of the phase current exceeding the threshold such that a first duration set based on a first value of the phase current that is larger than a second value of the phase current is longer than a second duration set based on the second value.

12. A motor control method performed by a motor control device which controls a phase current of a motor by using drive voltage supplied to the motor, comprising:

a control initiation-stop determination step of switching a state of the drive voltage to a stop state in which a control is stopped, a start state in which the control is executed, or an initiation state; and a drive voltage control step of controlling the drive voltage based on the state switched by the control initiation-stop determination step, wherein in the control initiation-stop determination step, when the state of the drive voltage is to be transitioned from the stop state to the start state, the state of the drive voltage is switched to the initiation state during the transition from the stop state to the start state, in the drive voltage control step, the drive voltage is controlled such that the phase current increases or decreases in the initiation state as time elapses, in the control initiation-stop determination step, the state of the drive voltage is switched to the stop state when temperature of a switching element configured to generate the drive voltage exceeds a threshold, and in the control initiation-stop determination step, a duration of the initiation state is set based on a value of the temperature exceeding the threshold such that a first duration set based on a first value of the temperature that is larger than a second value of the temperature is longer than a second duration set based on the second value.

* * * * *